(12) United States Patent
Confalonieri

(10) Patent No.: US 11,137,099 B2
(45) Date of Patent: Oct. 5, 2021

(54) QUICK COUPLING FOR PIPES AND THE LIKE

(71) Applicant: C.MATIC S.p.A., Giussano (IT)

(72) Inventor: Orazio Confalonieri, Carate Brianza (IT)

(73) Assignee: C.MATIC S.P.A., Giussano (IT)

( * ) Notice: Subject to any disclaimer, the term of this patent is extended or adjusted under 35 U.S.C. 154(b) by 0 days.

(21) Appl. No.: 16/829,057

(22) Filed: Mar. 25, 2020

(65) Prior Publication Data
US 2020/0309300 A1    Oct. 1, 2020

(30) Foreign Application Priority Data

Mar. 28, 2019   (IT) .................. 102019000004657

(51) Int. Cl.
   *F16L 37/084*    (2006.01)
   *F16L 37/092*    (2006.01)

(52) U.S. Cl.
   CPC ....... *F16L 37/0842* (2013.01); *F16L 37/0927* (2019.08)

(58) Field of Classification Search
   CPC ............ F16L 37/0842; F16L 37/0927; F16L 37/0915; F16L 37/086; F16L 37/096
   USPC ....................................................... 285/322
   See application file for complete search history.

(56) References Cited

U.S. PATENT DOCUMENTS

| | | | | | |
|---|---|---|---|---|---|
| 2,327,714 | A | * | 8/1943 | Iftiger, Sr. | F16L 37/1215 285/35 |
| 3,398,977 | A | * | 8/1968 | Yoneda | F16L 37/0842 285/45 |
| 5,005,877 | A | * | 4/1991 | Hayman | F16L 37/0842 285/321 |
| 5,209,528 | A | * | 5/1993 | Weh | F16L 37/121 285/315 |
| 5,261,707 | A | * | 11/1993 | Kotake | F16L 25/0045 285/322 |

(Continued)

FOREIGN PATENT DOCUMENTS

| | | |
|---|---|---|
| DE | 1958205 A1 | 5/1971 |
| DE | 3202367 A1 | 10/1982 |

(Continued)

*Primary Examiner* — David Bochna
(74) *Attorney, Agent, or Firm* — Vorys, Sater, Seymour and Pease LLP

(57) ABSTRACT

An intake for quick coupling pipes, to form a joint, including a body defining a central axis and a first channel at least partially centered relative to the central axis to partially house the joint, an annular sealing element movably within the first channel including a plurality of fastening sectors to reciprocally radially move and define release and clamping positions, an extractor partially in the body, movable along the central axis relative to the body and allowing the sealing element to pass from the clamping position to the release position. The body includes an obstruction defining a ring within the first channel. The sealing element defines an interference portion interfering with the obstruction. The obstruction and interference portion form a circular fulcrum around which the fastening sectors rotate and provide the release position as result of opening thrust caused by the extractor or joint passing in the sealing element.

11 Claims, 5 Drawing Sheets

(56) References Cited

U.S. PATENT DOCUMENTS

| | | | | | |
|---|---|---|---|---|---|
| 5,649,723 | A | * | 7/1997 | Larsson | F16L 37/1215 |
| | | | | | 285/322 |
| 5,788,290 | A | * | 8/1998 | Meisinger | F16L 37/1215 |
| | | | | | 285/322 |
| 5,934,709 | A | * | 8/1999 | Morrison | F16L 37/0842 |
| | | | | | 285/39 |
| 6,964,435 | B2 | * | 11/2005 | Wolf | F16L 37/0842 |
| | | | | | 285/320 |
| 8,491,015 | B2 | * | 7/2013 | Confalonieri | F16L 37/0842 |
| | | | | | 285/317 |
| 8,844,979 | B2 | * | 9/2014 | Danielson | F16L 37/121 |
| | | | | | 285/322 |
| 10,041,616 | B2 | * | 8/2018 | Danielson | F16L 37/0847 |

FOREIGN PATENT DOCUMENTS

| | | | | | |
|---|---|---|---|---|---|
| EP | 2385289 | A1 | | 11/2011 | |
| FR | 1460993 | A | * | 12/1966 | F16L 37/0842 |
| GB | 1533785 | A | * | 11/1978 | F16L 37/0842 |

\* cited by examiner

QUICK COUPLING FOR PIPES AND THE LIKE

FIELD OF THE INVENTION

The present invention relates to an intake for a quick coupling for pipes and the like, which is configured to be coupled in fluidic through connection to a joint, and comprises a body defining a central axis and a first channel at least partially centred with respect to the central axis and suitable to at least partially house the joint, an annular sealing element movably housed within the first channel and including a plurality of fastening sectors suitable to be reciprocally moved in a radial direction and defining a release position in which the sealing element allows the joint to move with respect to the intake, and a clamping position, in which the sealing element fastens the joint to the intake, and an extractor partially housed in the body, movable along the central axis with respect to the body and suitable to allow the sealing element to pass from the clamping position to the release position.

In particular, the present invention relates to a quick coupling suitable to simplify, secure and accelerate pipe connection and disconnection operations of lines for moving fluids without needing to use particular tools.

DESCRIPTION OF THE PRIOR ART

As is known, the creation of pressurised fluid dynamic lines requires the joining of pipes to tanks, other pipes or various elements with means suitable to put them in fluid through connection.

Such means can comprise two components, at least one of which is made integral with one of the two pipes by means of appropriate solutions, such as welding, forcing, or band clamps. Such components are usually provided with threads suitable to fasten them reciprocally, forming the aforesaid connection.

At present, the quick couplings suitable to connect and disconnect two pipes through quick and easy manual operations are increasingly preferred to the means described above. Such couplings usually have two base elements: an intake and a joint, which is suitable to be partially inserted into the aforesaid intake.

One first example of a coupling, described, for example, in the ISO 8434-1:2007(E) regulation, involves the fastening between the joint and the intake being made by means of forcing. In particular, the intake comprises three elements: a first base body provided with a thread, a nut suitable to be engaged with the aforesaid thread, and a conical element housed, between the two aforesaid components, in a special cavity made in the base body. When the nut is fastened to the base body, the conical element is forced between the aforesaid base body and the joint, forming the fastening.

Another type of coupling is formed by so-called quick couplings. In such couplings, the joint has a groove or overhang on the outer surface, while the intake comprises an outer casing having a cylindrical cavity suitable to house the joint. Furthermore, this cavity has a recess in which a plurality of fastening elements are housed, which are suitable to be moved radially due to an elastic O-ring.

Initially, the joint is inserted into the intake and the fastening elements are pushed from the outer surface of the joint into the cavity thus compressing the elastic ring. When the groove or overhang is presented to the fastening elements, the elastic ring pushes the aforesaid elements radially, which are inserted into the groove, forming the fastening between the joint and the intake.

Finally, in order to allow the aforesaid fastening to be quickly undone, a sliding body is provided, which disengages the fastening elements from the groove or overhang when it is manually pushed by an operator, allowing the detachment of the joint from the intake.

The prior art stated above has a number of important drawbacks.

In fact, both types of currently known quick coupling are subject to rapid deterioration.

Indeed, in the first example described above, the fastening and unfastening operations are relatively slow as it is necessary to intervene using keys and the like.

Furthermore, fastenings by interlocking can become inseparable due to deposits or deterioration of the material and, thus, it is impossible to replace any faulty components. In some cases, even the use of special tools, such as, keys, for example, may not be sufficient to undo the fastening.

In the second example, the fastening elements may move, resulting in an unstable quick coupling, i.e. the inability to withstand great pressures.

A further problem owes to the fact that known quick couplings are not suitable to withstand elevated pressures.

Yet another problem is represented by the fact that the two types of actuators are not mutually interchangeable, i.e. it isn't possible to couple the joint of one of them to the intake of the other.

To overcome part of the listed drawbacks, a device has been created, which is described in patent application MI2010A 000772.

This patent application describes a quick coupling comprising an intake and a joint wherein the intake includes an outer body defining an annular cavity and a sealing element housed at least partially in the annular cavity and movable therein; thus, the sealing element includes a plurality of fastening sectors suitable to be moved reciprocally in a radial direction and defining a release position, in which the sealing element is withdrawn inside the annular cavity so as to allow the joint to move with respect to the intake, and a clamping position, in which the sealing element fastens the joint to the intake; furthermore, an extractor is present, partially housed in the outer body and movable so as to move the sealing element from the clamping position to the release position by means of teeth placed between the fastening sectors.

However, this device also has the important drawback of having to form an annular cavity having a specific shape including an undercut.

This undercut is difficult to process with a machine tool and results not only in an increase in the complexity of the device, but also in the times and costs needed to produce the same.

SUMMARY OF THE INVENTION

In this context, the technical task underlying the present invention is to develop a quick coupling for pipes and the like capable of substantially overcoming at least part of the stated drawbacks.

In the context of said technical task, it is an important object of the invention to develop a quick coupling, which is reliable and durable. In particular, it is an important object of the invention that the quick coupling is easy to use and that it doesn't deteriorate as a result of use.

Yet another fundamental object to obtain a quick coupling that is suitable to withstand elevated pressures.

Another important object of the invention is that it is usable, at least partially, with the currently known types of couplings.

Moreover, a further object of the invention is to produce a quick coupling that has a simplified structure and that, for this reason, presents no processing difficulty and correspondingly low costs in terms of time and money.

In conclusion, a further task of the invention is to produce a quick coupling that is versatile and that enables it to be used according to at least two different configurations of use.

The technical task and specified objects are achieved by an intake for a quick coupling for pipes and the like, which is configured to be coupled in fluidic through connection to a joint, and comprises a body defining a central axis and a first channel at least partially centred with respect to the central axis and suitable to at least partially house the joint, an annular sealing element movably housed within the first channel and including a plurality of fastening sectors suitable to be reciprocally moved in a radial direction and defining a release position in which the sealing element allows the joint to move with respect to the intake, and a clamping position, in which the sealing element fastens the joint to the intake, an extractor partially housed in the body, movable along the central axis with respect to the body and suitable to allow the sealing element to pass from the clamping position to the release position, wherein the body includes an obstruction defining at least one ring, which is centred with respect to the central axis and housed within the first channel, the sealing element defines an interference portion interfering with the obstruction in a direction parallel to the central axis and the obstruction and the interference portion form a circular fulcrum around which the fastening sectors rotate, moving away from each other, and provide the release position as a result of an opening thrust caused by the extractor or the joint when the extractor or the joint pass in the sealing element.

Preferred technical solutions are highlighted in the dependent claims.

BRIEF DESCRIPTION OF THE DRAWINGS

The features and advantages of the invention are clarified below by the detailed description of preferred embodiments of the invention, with reference to the accompanying drawings, wherein.

DESCRIPTION OF THE PREFERRED EMBODIMENTS

Figure 1:
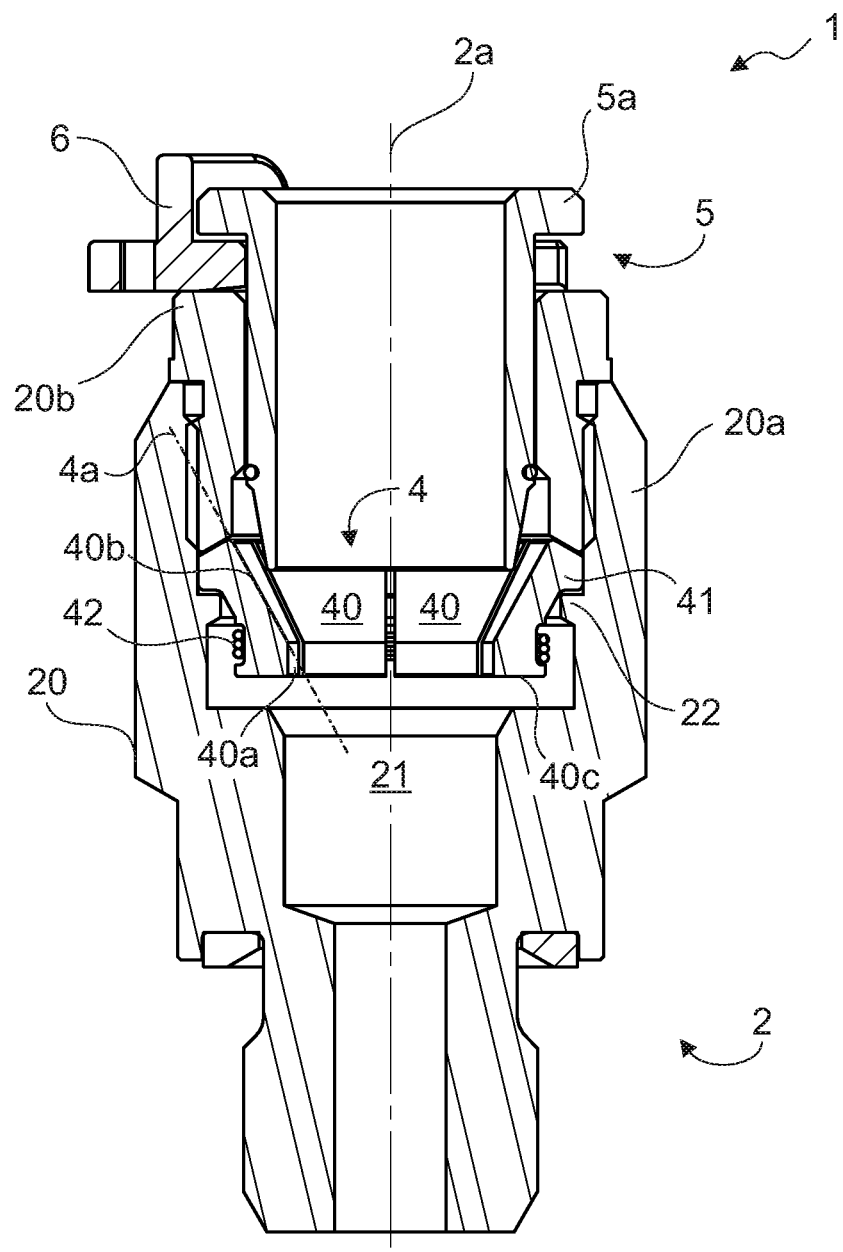
FIG. 1 shows an intake of a quick coupling for pipes and the like according to the invention without any joint inserted.
Figure 2:
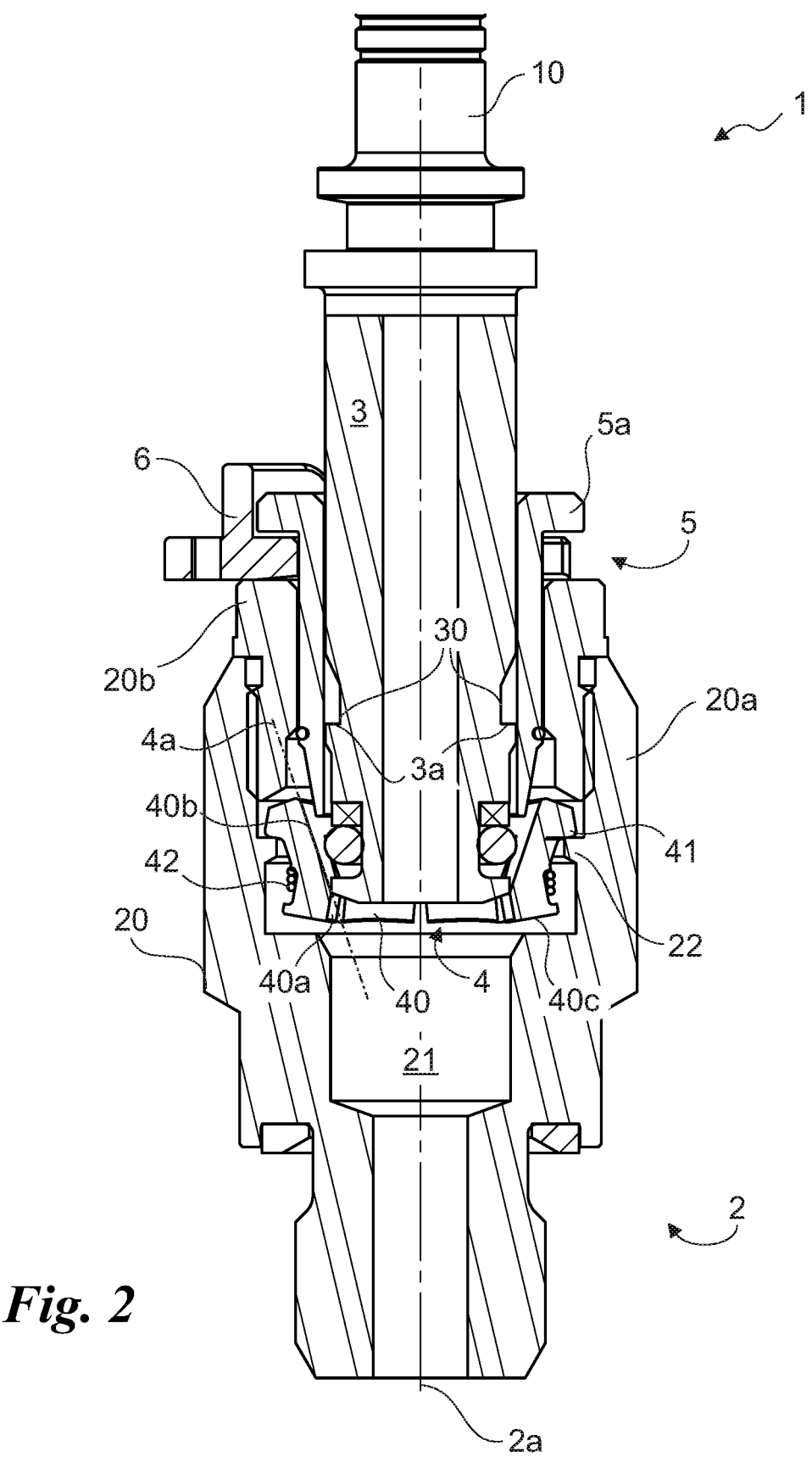
FIG. 2 illustrates the insertion of the joint inside the intake of a quick coupling for pipes and the like according to the invention, in particular when the joint provides the opening thrust suitable to induce the sealing element to pass from the clamping position to the release position.
Figure 3:
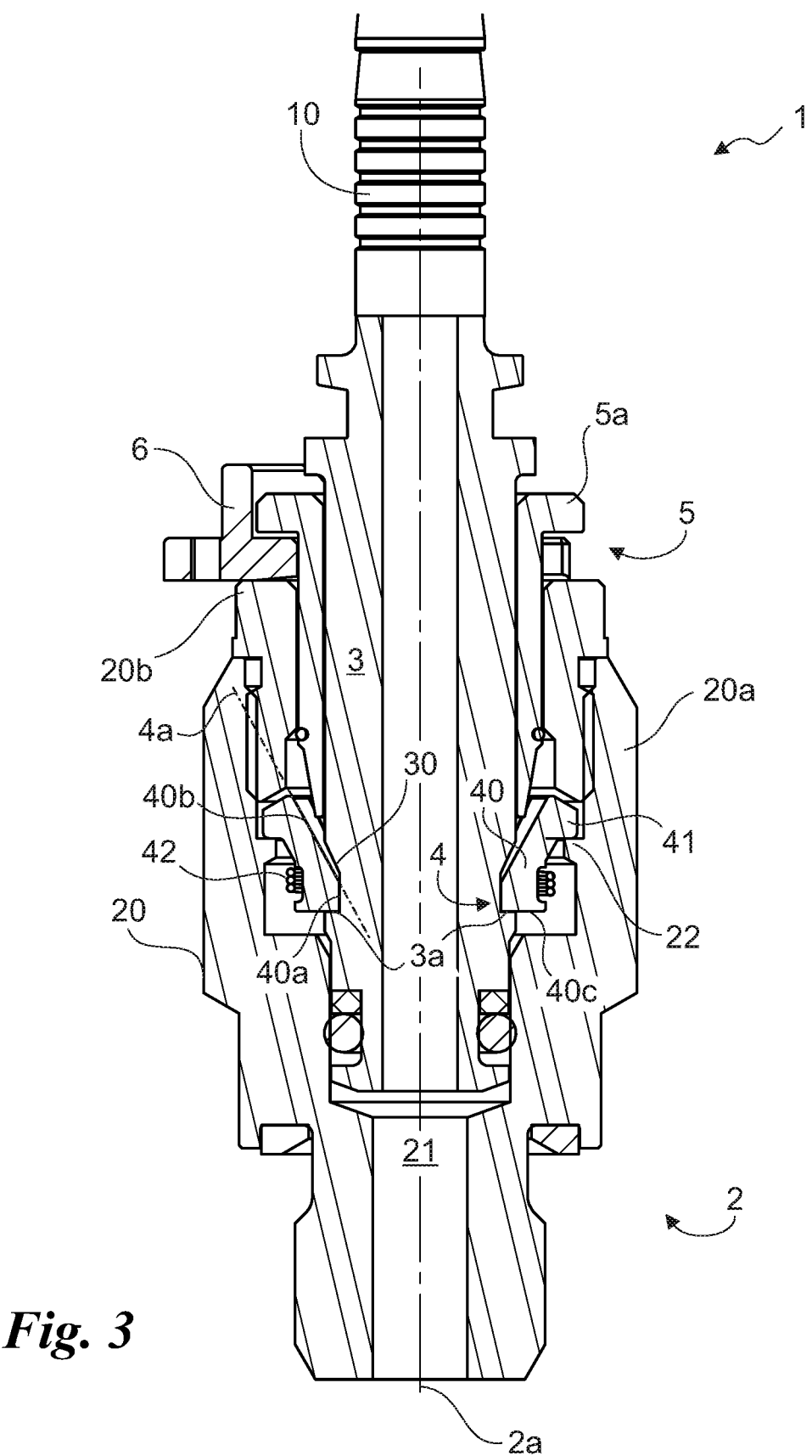
FIG. 3 is the joint inserted inside the intake of a quick coupling for pipes and the like according to the invention, in particular when the sealing element is in the clamping position and partially housed inside the groove of the joint.
Figure 4:
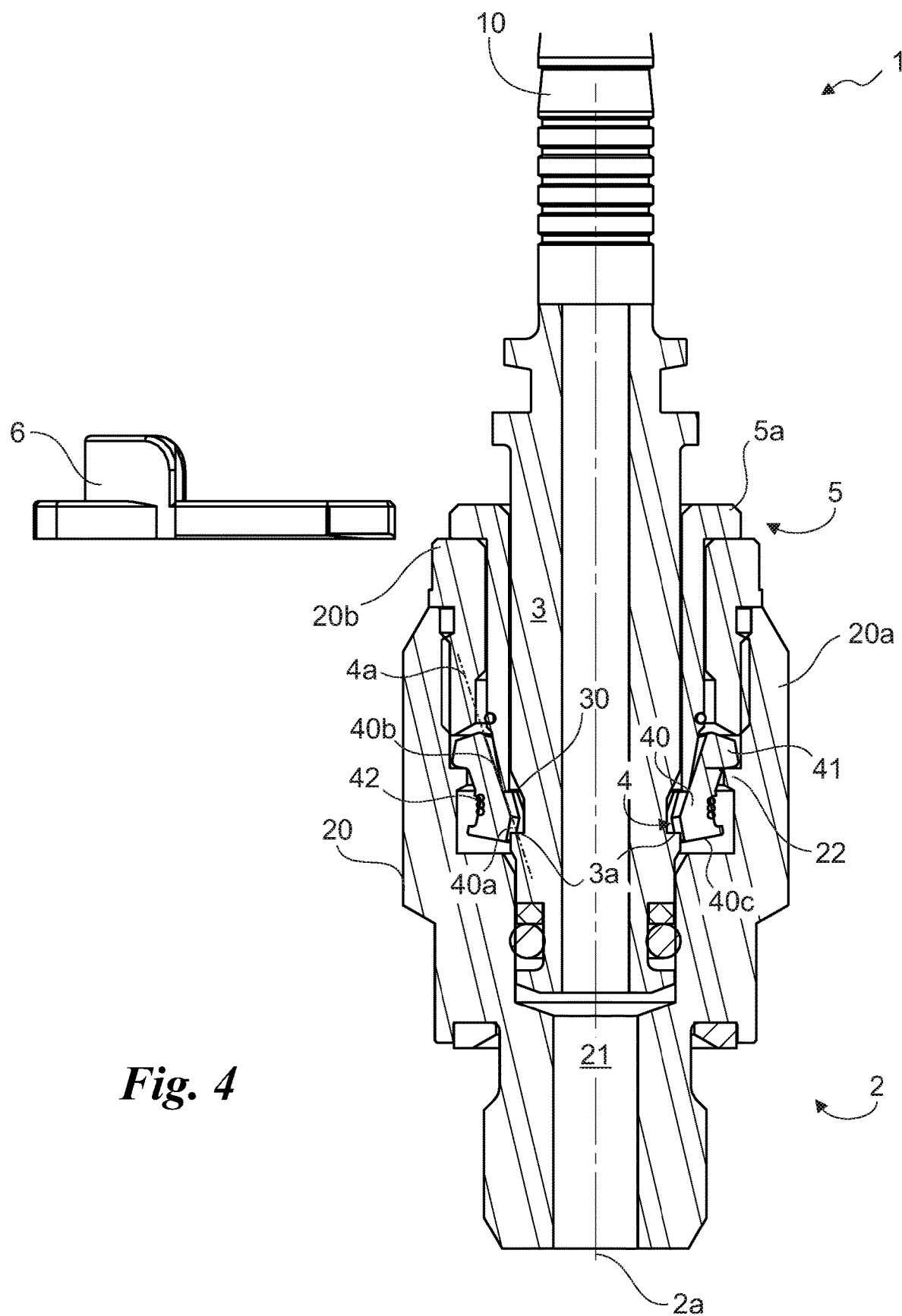
FIG. 4 represents the removal of the joint from the intake of a quick coupling for pipes and the like according to the invention, in particular when the stop is removed and the extractor provides the opening thrust needed to allow the sealing element to pass from the clamping position to the release position.
Figure 5:
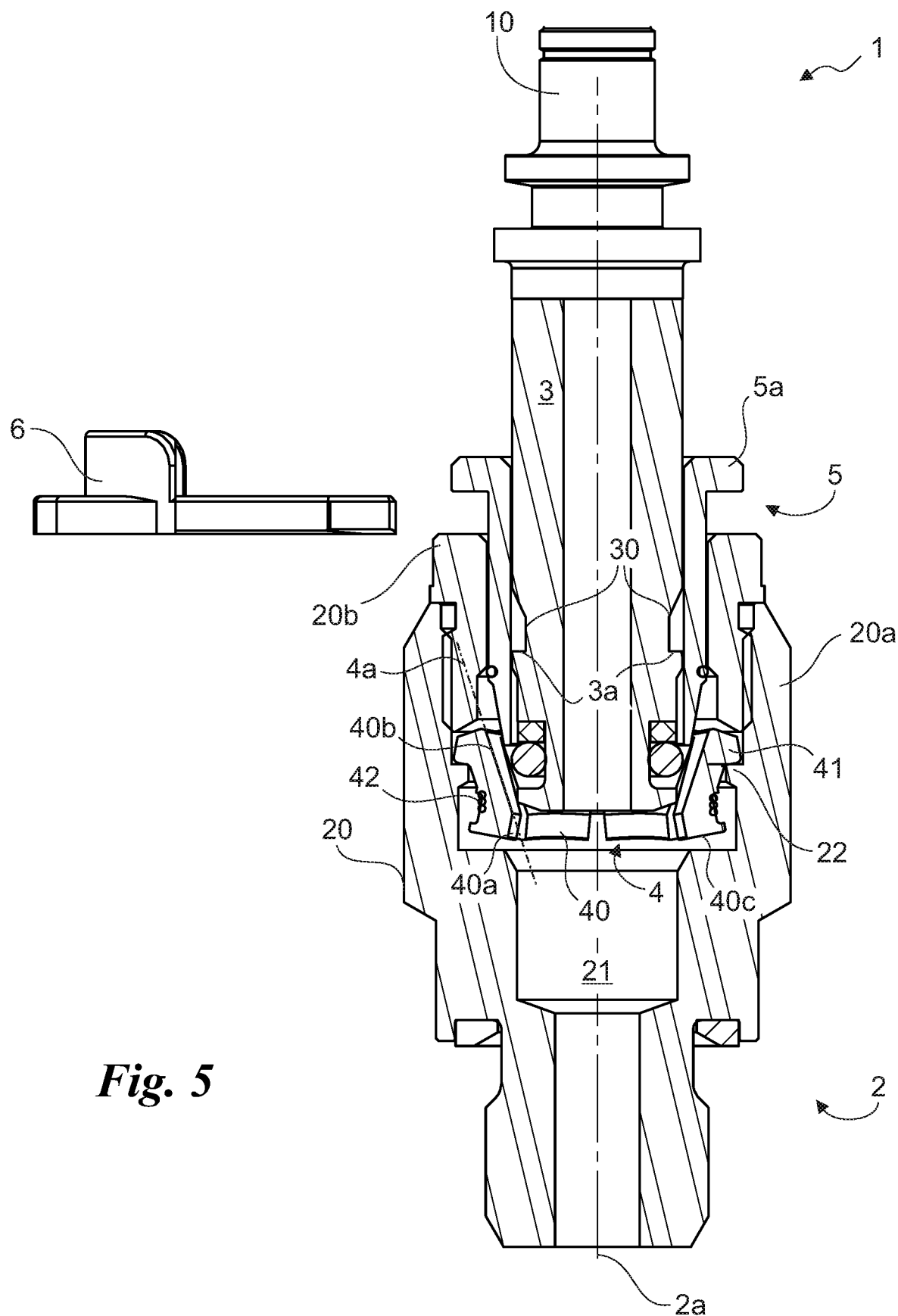
FIG. 5 shows the completion of the removal of the joint from the intake of a quick coupling for pipes and the like according to the invention, in particular when both the extractor and the joint do not interact with the sealing element and the sealing element is in the clamping position.

In the present document, when measurements, values, shapes and geometric references (such as perpendicularity and parallelism) are associated with words like "approximately" or other similar terms, such as "almost" or "substantially", they shall be understood as without errors of measurement or imprecisions due to errors of production and/or manufacturing and, above all, without a slight divergence from the value, measurement, shape or geometric reference with which it is associated. For example, if associated with a value, such terms preferably indicate a divergence of no more than 10% of the value itself.

Furthermore, when terms such as "first", "second", "upper", "lower", "principal" and "secondary" are used, they do not necessarily identify an order, relationship priority or relative position, but they can simply be used to distinguish different components more clearly from one another.

Unless otherwise stated, the measurements and data reported in this text shall be considered as performed in International Standard Atmosphere ICAO (ISO 2533:1975).

With reference to the Figures, the quick coupling for pipes and the like according to the invention is globally denoted with number 1.

The quick coupling 1 is suitable to connect two pipes 10 or, alternatively, a pipe 10 to a device, such as, for example, a compressor, a tank or another similar element quickly and in an easily separable manner.

Preferably, the quick coupling 1 comprises an intake 2 and a joint 3.

Preferably, the intake 2 and the joint 3 are configured to be coupled to each other. In particular, they are coupled to each other so as to be in fluidic through connection.

Thus, preferably, the intake 2 includes a first channel 21 while the joint 3 defines a second channel.

Preferably, the first channel 21 is suitable to contain at least part of the joint 3. Furthermore, the first channel 21 is in fluidic through connection with the second channel when the intake 2 and the joint are fastened to each other.

More specifically, the first channel 21 is suitable to house the joint 3 through an inlet mouth. Whereas, the second channel comprises an outlet mouth, through which the fluid passes from the joint 3 to the intake 2 or vice versa.

Preferably, when they are coupled, the quick coupling 1 forms a hermetic seal. Preferably, the intake 2 is fastened to part of a tank or the like, while the joint 3 is fastened to a pipe 10.

Preferably, both the joint 3 and the intake 2 are substantially cylindrical shaped, but they could also define other more squared shapes.

Preferably, the intake 2 comprises a body 20. Preferably, the body 20 is a tubular element suitable to house at least part of the joint 3. Thus, the body 20 substantially defines the shape of the intake 2.

It can be a hollow cylinder having, for example, section variations along the extension thereof.

Preferably, the body 20 defines a central axis 2a.

Preferably, the central axis 2a is the axis around which the body 20 develops. Furthermore, when the intake 2 and the joint 3 are coupled, they are preferably reciprocally aligned with respect to the central axis 2a.

Furthermore, the body 20 defines the first channel 21. In particular, the inner cavity of the body 20 forms the first channel 21. Preferably, the first channel 21 is partially centred with respect to the central axis 2a.

Furthermore, the first channel 21 is suitable to house the joint 3 at least partially. Thus, the body 20 can be made in a single piece or it can include a plurality of elements.

Preferably, the body 20 comprises at least two different components.

In particular, the body 20 comprises at least a first portion 20a and a second portion 20b.

The first portion 20a is substantially the body portion 20 suitable to communicate with a pipe 10 or with an external device. Preferably, the second portion 20b is the body portion 20 suitable to communicate, directly or indirectly, with the joint 3.

More specifically, the second portion 20b doesn't communicate directly with the joint 3, but it is the first body portion 20, which houses the joint 3 when the latter is inserted in the intake 2. Thus, the second portion 20b forms the inlet mouth of the intake 2.

Preferably, the first portion 20a and the second portion 20b are removably fastened.

For example, they can comprise threads, which allow the second portion 20b to be screwed inside of the first portion 20a.

Preferably, on the outside, the joint 3 has a substantially cylindrical coupling surface with the axis substantially coinciding with the central axis 2a, when the joint 3 is inserted in the intake 2. Furthermore, this coupling surface is preferably also continuous, i.e. devoid of overhangs or other similar elements, except for one single discontinuity.

In fact, the joint 3 preferably comprises a groove 30. The groove 30 forms the aforesaid discontinuity and is substantially asymmetrical and formed at a predetermined distance from the outlet mouth.

It also has a contrast surface 3a, close to the outlet mouth, substantially perpendicular to the central axis 2a.

Preferably, the intake 2 also includes a sealing element 4. Preferably, the sealing element 4 is annular and movably housed inside the first channel 21.

More specifically, the sealing element 4 is also preferably partially movable in a radial direction to the central axis 2a, preferably having an almost circular shape. Preferably, the sealing element 4 is inserted inside the body 20 and thus, it is substantially surrounded by the latter.

Advantageously, the sealing element 4 includes a plurality of fastening sectors 40. The fastening sectors 40 are at least two in number, but there can also be more. Preferably, there are, conveniently, six in number.

In any case, the fastening sectors 40 are preferably suitable to be reciprocally moved in a radial direction to the central axis 2a.

Thus, by virtue of the possible movements, the fastening sectors 40 define at least a release position and a clamping position.

Preferably, in the release position, the sealing element 4 allows the joint 3 to move with respect to the intake 2. Preferably, in the clamping position, the sealing element 4 fastens the joint 3 to the intake 2. Thus, in the clamping position, the joint 3 is substantially locked onto the intake 2.

The movement mechanism is made, more specifically, by the interaction between the sealing element 4, the intake 2, and the joint 3.

Advantageously, in this respect, the body 20 comprises an obstruction 22. Preferably, the obstruction 22 defines a ring centred with respect to the central axis 2a and housed inside the first channel 21.

More specifically, the obstruction 22 defines a section narrowing, where the section is assessed perpendicularly to the central axis 2a, of the first channel 21 so as to obstruct the advancing of the sealing element 4 beyond the obstruction 22.

Advantageously, in turn, the sealing element 4 defines an interference portion 41. Preferably, the interference portion 41 interferes with the obstruction 22 in a direction parallel to the central axis 2a. Thus, the interference portion 41 can be an annular portion of the sealing element 4 defining a diameter, which is greater than, or equal to the obstruction 22.

Furthermore, at least part of the interference portion 41 can rest on the obstruction 22. In fact, preferably, the obstruction 22 and the interference portion 41 interact, at least in part, along a plane perpendicular to the central axis 2a.

More specifically, the interference portion 41 is defined by part of the fastening sectors 40.

In fact, preferably, the obstruction 22 and the interference portion 41 preferably form a circular fulcrum around which the fastening sectors 40 rotate. Thus, each of the fastening sectors rotates substantially away from or towards the central axis 2a.

In this way, i.e. by rotating, the fastening sectors 40 reciprocally move apart, forming the release position.

Preferably, the release position is reached, in particular, as a result of an opening thrust provided on the fastening sectors 40.

Thus, during the transition from the release position to the clamping position, there is a reduction in the distance between the fastening sectors 40 and a consequent reduction in the diameter of the sealing element 4 respectively.

In particular, the reduction in distance between the fastening sectors 40 is obtained by opposing means 42.

The sealing element 4 comprises said opposing means 42.

Preferably, the opposing means 42 are suitable to oppose the transition of the sealing element 4 from the clamping position to the release position.

More preferably, the opposing means 42 are elastic means. Thus, preferably, the sealing element 4 passes from the release position to the clamping position when the aforesaid opening thrust is absent, due to the opposing means 42.

The opposing means 42 can consist of a spring or also other elastic elements, such as O-rings or other.

Preferably, the opposing means 42 surround the sealing element 4 externally.

Thus, the opposing means 42 can be substantially annular and arranged inside a housing positioned on the outer edge, i.e. the edge furthest from the central axis 2a, of each fastening sector 40.

Furthermore, the opposing means 42 are preferably suitable to occupy practically the whole height of the housing calculated in the direction parallel to the central axis 2a, so as to guarantee the correct positioning of the opposing means 42 and prevent undesired movements thereof.

Even more specifically, and as suggested, the opposing means 42 include a metal helicoid spring, preferably made of steel. It is preferably a spiral spring, the ends of which are straight so as to prevent their being inserted between two fastening sectors 40, when the sealing sector is in the release position, and thus preventing a return to the clamping position. In particular, the ends are tangential to the circumference defined by the spring in the rest position.

Finally, each of the fastening sectors 40 preferably has a projection 40a on the face close to the central axis 2a.

Preferably, in the clamping position, the projection 40a is suitable to be inserted inside the groove 30 reciprocally locking the joint 3 to the intake 2, whereas, when it moves into the release position, it exits the aforesaid groove 30, allowing the reciprocal movement between the joint 3 and the intake 2.

Thus, preferably, in the quick coupling 1 the groove 30 is suitable to house the projection 40a so as to lock the movement of the joint 3 with respect to said body 20.

The projection 40a has a conical upper wall 40b, which extends, advantageously, according to an oblique direction 4a, which is inclined with respect to the central axis 2a.

In particular, preferably, the conical upper wall 40b is suitable to allow the fastening element 4 to move from the clamping position to the release position, for example, when the joint 3 is inserted in the intake 2. In particular, when the joint 3 is inserted in the intake 2, it presses directly or indirectly on the conical upper wall 40b, determining the rotation of the fastening sectors 40, and the relative reciprocal moving apart, allowing the complete insertion of the joint 3. In particular, the oblique direction 4a can be tilted by an angle, which is substantially less than 45° and, more preferably, between 25° and 35° with respect to the central axis 2a. Furthermore, the projection 40a defines a lower surface 40c, which is almost perpendicular to the central axis 2a, suitable to interact with the contrast surface 3a of the groove 30. In the removal direction of the joint 3, this geometry causes the lower surface 40c to abut against the contrast surface 3a, preventing the removal and tightening the joint 3, aligning it with the axis 2a.

Furthermore, the intake 2 also comprises an extractor 5.

Preferably, the extractor 5 is partially housed in the body 20.

Furthermore, the extractor 5 is preferably movable along the central axis 2a with respect to the body 20. In particular, the extractor 5 is suitable to allow the sealing element 4 to pass from the clamping position to the release position. To this end, the extractor 5 is preferably suitable to provide the opening thrust on the fastening sectors 40 so as to allow the release of the groove 30 of the joint 3 and allow the joint 3 to be removed.

Preferably, the extractor 5 is an annular element, which has at least one conical portion.

Preferably, this conical portion is suitable to interact with the sealing element 4. In particular, the conical portion interacts with the conical upper wall 40b of the fastening sectors 40 and can be substantially complementary shaped thereto. Therefore, when used, the extractor 5 acts like a sort of wedge suitable to open the sealing element 4.

Thus, preferably, the opening thrust can be provided both by the extractor 5 and by the joint 3. In particular, the opening thrust is provided by the joint 3 when the latter is inserted in the intake 2. Instead, the opening thrust is provided by the extractor 5 when the joint 3 is in the intake 2 and the joint 3 is intended to be removed. In this step, the extractor 5 exerts the thrust needed to open the sealing element 4 in order to be able to remove the joint 3.

Therefore, in general, the obstruction 22 and the interference portion 41 form the release position as a result of an opening thrust provided either by the extractor 5 or by the joint 3 when the extractor 5 or the joint 3 pass inside the sealing element 4.

It is important to specify that, clearly, the transition from the release position to the clamping position takes place following the insertion of the joint 3, due to the fact that the opening thrust is absent when the groove 30 passes at the fastening sectors 40 and the fastening sectors 40 are inserted in the groove 30, specifically, the projections 40a.

Preferably, from a structural point of view, the extractor 5 is thus an element substantially interposed between the body 20 and the joint 3.

Preferably, the extractor 5 is directly inserted in the second portion 20b.

Therefore, the second portion 20b is suitable to substantially accommodate the extractor 5 and the joint 3, while the first portion 20a accommodates the sealing element 4 and includes the obstruction 22.

The sealing element 4 is preferably an element, which can be removed from the first channel 21, for example, by sliding.

Preferably, the second portion 20b is an annular component, which is removably fastened, at least partially, inside the first portion 20a, as said previously, so that the sealing element 4 is locked between the first portion 20a and the second portion 20b. More specifically, the second portion 20b locks the sealing element 4 between the obstruction 22 and the second portion 20b along the central axis 2a. Again, in detail, the extractor 5, which is preferably housed inside the second portion 20b is suitable to be moved with respect to the second portion 20b. Nonetheless, the extractor 5 is suitable to move with respect to the body 20 in a direction almost parallel to the central axis 2a.

Furthermore, the extractor 5 has an abutment disc 5a at the base outside the body 20.

Preferably, the abutment disc 5a is suitable to abut against the upper edge of the body 20, in particular of the second portion 20b, when the extractor 5 is pressed against the aforesaid body 20.

Besides the aforesaid components, the intake 2 comprises a stop 6 suitable to be inserted between the joint 3 and the intake 2, between the abutment disc 5a and the body 20, specifically, the second portion 20b, to prevent the extractor 5 from moving with respect to the aforesaid body 20.

Preferably, the stop 6 forms a stop ring.

It can be an open elastic ring, i.e. the circumference of which is not complete, and, more specifically, a seger ring or the like.

However, it may be any element, also a rigid element, which can be interposed and removed on command from the extractor 5.

In a preferred embodiment, the joint 3 can comprise a groove on the outer surface thereof suitable to house a sealing element, such as an O-ring, suitable to guarantee the fluid coupling 1 seal.

Alternatively, the intake 2 can comprise an O-ring or another similar means suitable to guarantee the fluid coupling 1 seal. Advantageously, if present, the O-ring is at least partially housed in a cavity opportunely made in the body 20.

In this case, the O-ring of the joint is suitable to abut against a portion of the first channel 21 so as to hermetically seal the same. In particular, the O-ring can abut at a section narrowing of the first channel 21.

The operation of the quick coupling 1 for pipes and the like, which is described above in structural terms, is the following.

Once the pipes 10 have been fastened to the joint 3 and the intake 2 to a device, the joint 3 is inserted in the intake 2, reciprocally fastening the aforesaid components.

The joint 3 crosses the extractor 5 and is brought into abutment against the projections 40a thereof of the fastening sectors 40. Thus, the joint 3 starts to press against the aforesaid projections 40a, providing the opening thrust, determining the transition from the clamping position to the release position of the sealing element 4.

In particular, the fastening sectors 40 are reciprocally moved away, i.e. the sealing element 4 increases the diameter thereof, and the fastening sectors 40 are rotated around the fulcrum formed by the obstruction 22 and by the interference portion 41, allowing completion of the insertion of the joint 3. In particular, the joint 3, continuing the travel thereof, comes into contact with the O-ring deforming it and forming the fluid seal, or the O-ring of the joint 3 comes into contact with a portion of the body 20, deforming it and forming the seal.

When the joint 3 is completely inserted, the opening thrust is absent due to the presence of the groove 30, substantially facing the fastening sectors 40. The latter are thus pressed by the opposing means 42, which push the projections 40a into the aforesaid groove 30, fastening the joint 3 to the intake 2 and bringing the sealing element 4 back into the clamping position.

Consequently, the sealing element 4 axially compresses the joint 3, centering it along the axis 2a.

Furthermore, before locking, the stop 6 is preferably inserted between the abutment disc 5a and the body 20, preventing the extractor 5 from moving, so as to avoid an undesired undoing of the quick coupling 1.

When the disconnection of the quick coupling 1 is desired, i.e. the detachment of the joint 3 from the intake 2, the stop 6 is removed from the housing thereof and the extractor 5 is lowered, bringing the abutment disc 5a almost in contact with the body 20, in particular with the second portion 20b.

This extractor 5 movement determines the transition of the sealing element 4 from the clamping position to the release position, i.e. the projections 40a of the fastening sectors 40 exit the groove 30, allowing the joint 3 to be removed from the intake 2.

Again owing to the opposing means 42, after removing the joint 3, the sealing element 4 returns to the clamping position with the fastening sectors 40 reciprocally converging.

The quick coupling 1 for pipes and the like according to the invention achieves important advantages.

In fact, the quick coupling 1 offers elevated duration and reliability.

In fact, the configuration of the sealing element 4 and, in particular, the movement of the fastening sectors 40 makes it possible to avoid damage, which reduces the quality of the clamping between the joint 3 and the intake 2.

Thus, another advantage is represented by the particular geometry of the couplings between the joint 3 and the intake 2. For this reason, the quick coupling 1 is capable of withstanding pressures of up to 350 bar.

Furthermore, the quick coupling 1 has a simplified structure and a sealing element 4 operating mechanism, which is defined by simple elements, such as the obstruction 22. The obstruction 22 doesn't have undercuts and, thus, doesn't require particular processing for production. Therefore, the quick coupling 1 is easy to make and reduces the time and cost of production with respect to quick couplings of the prior art.

In conclusion, the quick coupling 1 allows a different fastening configuration to be adopted because, if necessary, it is possible to use only the first portion 20a and fasten, for example, the second portion 20b directly to a slot, which has compatible fastening means, such as threads.

Variations may be made to the invention described herein without departing from the scope of the inventive concept defined in the claims.

In this context, all details can be replaced by equivalent elements, and the materials, shapes, and dimensions may be any materials, shapes, and dimensions.

The invention claimed is:

1. An intake for a quick coupling for pipes and the like, which is configured to be coupled in fluidic through connection to a joint, and comprises:
   a body defining a central axis and a first channel at least partially centered with respect to said central axis and suitable to at least partially house said joint,
   an annular sealing element movably housed within said first channel and including a plurality of fastening sectors suitable to be reciprocally moved in a radial direction and defining a release position in which said sealing element allows said joint to move with respect to said intake, and a clamping position, in which said sealing element fastens said joint to said intake,
   an extractor partially housed in said body, movable along said central axis with respect to said body and suitable to allow said sealing element to pass from said clamping position to said release position, wherein
   said body includes an obstruction defining at least one ring, which is centered with respect to said central axis and housed within said first channel,
   said sealing element defines an interference portion interfering with said obstruction in a direction parallel to said central axis and
   said obstruction and said interference portion form a circular fulcrum around which said fastening sectors rotate, moving away from each other, and provide said release position as a result of an opening thrust caused by said extractor or said joint when said extractor or said joint pass in said sealing element.

2. The intake according to claim 1, wherein said sealing element comprises opposing means suitable to oppose the transition of said sealing element from said clamping position to said release position and said sealing element passes from said release position to said clamping position when said opening thrust is absent.

3. The intake according to claim 2, wherein said obstruction and said interference portion interact at least in part along a plane perpendicular to said central axis,
   wherein said extractor has an abutment disc suitable to abut against said body and said intake comprises a stop ring suitable to be inserted between said abutment disc and said body thereby preventing said extractor to move with respect to said body,
   wherein each of said fastening sectors comprises at least one projection suitable to fasten said joint in said intake, when said fastening element is in said clamping position.

4. The intake according to claim 1, wherein said obstruction and said interference portion interact at least in part along a plane perpendicular to said central axis.

5. The intake according to claim 1, wherein said extractor has an abutment disc suitable to abut against said body and said intake comprises a stop ring suitable to be inserted between said abutment disc and said body thereby preventing said extractor to move with respect to said body.

6. The intake according to claim 1, wherein each of said fastening sectors comprises at least one projection suitable to fasten said joint in said intake, when said sealing element is in said clamping position.

7. The intake according to claim 6, wherein said projection comprises a conical upper wall extending in an oblique direction with respect to said central axis and suitable to allow said sealing element to pass from said clamping position to said release position, when said joint is inserted in said intake.

8. The intake according to claim 7, wherein said extractor is suitable to press against said conical upper wall so as to provide said opening thrust in order to move said sealing element from said clamping position to said release position.

9. The intake according to claim 6, wherein said projection has a lower surface substantially perpendicular to said central axis and suitable to obstruct the movement of said joint along said central axis when said sealing element is in the clamping position.

10. The intake according to claim 1, wherein said body comprises a first portion and a second portion, said first portion including said obstruction and said second portion being an annular component removably fastened, at least partially, within said first portion so that said sealing element is blocked between said obstruction and said second portion along said central axis, said extractor being housed within said second portion and suitable to be moved with respect to said second portion.

11. A quick coupling for pipes and the like comprising an intake according to claim 1 and said joint, wherein said joint has a groove suitable to accommodate said projection so as to block the movement of said joint with respect to said body.

* * * * *